US007613913B2

(12) United States Patent
Haban et al.

(10) Patent No.: US 7,613,913 B2
(45) Date of Patent: Nov. 3, 2009

(54) DIGITAL ARCHITECTURE USING ONE-TIME PROGRAMMABLE (OTP) MEMORY

(75) Inventors: Scott Haban, Austin, TX (US); G. Tyson Tuttle, Austin, TX (US); Gregory A. Hodgson, Pflugerville, TX (US)

(73) Assignee: Silicon Laboratories Inc., Austin, TX (US)

( * ) Notice: Subject to any disclaimer, the term of this patent is extended or adjusted under 35 U.S.C. 154(b) by 380 days.

(21) Appl. No.: 11/385,520

(22) Filed: Mar. 21, 2006

(65) Prior Publication Data
US 2007/0226477 A1 Sep. 27, 2007

(51) Int. Cl.
G06F 9/24 (2006.01)
(52) U.S. Cl. .................. 713/1; 713/2; 713/100
(58) Field of Classification Search ...... 713/1, 713/2, 100
See application file for complete search history.

(56) References Cited

U.S. PATENT DOCUMENTS

| 4,503,495 | A | * | 3/1985 | Boudreau | .................... 710/241 |
| 5,696,897 | A | * | 12/1997 | Dong | ........................... 714/15 |
| 2003/0134604 | A1 | * | 7/2003 | Gunzelmann | ................. 455/91 |
| 2004/0254013 | A1 | * | 12/2004 | Quraishi et al. | ............... 463/29 |
| 2005/0079889 | A1 | * | 4/2005 | Vaglica et al. | .............. 455/557 |
| 2006/0149881 | A1 | * | 7/2006 | Clayton et al. | .............. 710/302 |
| 2007/0198787 | A1 | * | 8/2007 | Jessani et al. | ............... 711/159 |
| 2007/0274120 | A1 | * | 11/2007 | Pinnow et al. | .............. 365/148 |

OTHER PUBLICATIONS

"PCD6001 Data Sheet", Philips Semiconductors, Apr. 17, 2001.*
Jacques Poivert, "Flexible ROM—STMicroelectronics Unveils New Fast-Programming High-Density OTP Memories for Mask ROM Replacement" Nov. 2002, pp. 1-3.

* cited by examiner

Primary Examiner—Tse Chen
(74) Attorney, Agent, or Firm—Trop, Pruner & Hu, P.C.

(57) ABSTRACT

In one aspect, the present invention includes an apparatus having a digital signal processor (DSP), a controller coupled to the DSP to provide control signals to the DSP, and a one-time programmable (OTP) memory coupled to the DSP and the controller. The OTP memory may include multiple code portions including a first code block to control the DSP and a second code block to control the controller.

15 Claims, 5 Drawing Sheets

DIGITAL ARCHITECTURE USING ONE-TIME PROGRAMMABLE (OTP) MEMORY

FIELD OF THE INVENTION

Embodiments of the present invention relate to a semiconductor device, and more particularly to such a device including a one-time programmable (OTP) memory.

BACKGROUND

Systems built using modern semiconductors often include programmable logic, in the form of processors, controllers and all manners of embedded devices that can be programmed to perform various functions. Many systems are built around such semiconductors and the functionality enabled by these devices is realized by firmware, which is software that is permanently programmed into memory of the system (and/or semiconductor device itself) and thus presents a permanent program for operation.

Oftentimes, firmware will be revised during the course of chip development. Furthermore, during a production lifecycle of a chip, firmware may regularly change to provide updates or different or improved features. Still further, different versions of firmware may enable a chip to be sold with different feature sets, often at different price points. Typically, firmware is implemented in a read-only memory (ROM) which is built by hard wiring the firmware program into a mask set used to fabricate the chip. Accordingly, the ROM is fixed and any variations to the firmware by way of updates, different versions, and the like require multiple mask sets. Mask sets are expensive to produce and furthermore can take many weeks to obtain. Such time and expense are not conducive to development cycles, nor is it efficient for production usage. Accordingly, a need exists for an improved manner of implementing firmware in a semiconductor device.

SUMMARY OF THE INVENTION

In one aspect, the present invention includes an apparatus having a digital signal processor (DSP), a controller coupled to the DSP to provide control signals to the DSP, and a one-time programmable (OTP) memory coupled to the DSP and the controller. The OTP memory may include multiple code portions including a first code block to control the DSP and a second code block to control the controller. The first and second code blocks may be firmware including functionality to perform radio control functions and analog calibration of an analog radio portion. The OTP memory may further include additional code such as a boot block to be accessed by the controller on power up and a boot loader to be executed by the controller, the boot loader including a decompression algorithm to decompress the first code block when it is provided to a first volatile memory associated with the DSP. In some implementations, the apparatus may be a radio tuner including the DSP, the controller, the OTP memory, and an analog radio portion, all integrated on a single substrate.

Another aspect of the present invention is directed to a method for fabricating a radio tuner semiconductor device with analog and digital subsystems. The digital subsystem may include a DSP, a microcontroller, and an OTP memory. The method further includes programming the radio tuner with firmware for operation of the DSP and the microcontroller. Such programming may be effected in different manners such as by downloading the firmware directly to one or more volatile memories of the radio tuner for execution therefrom. Such firmware may be a development firmware version where the OTP memory remains blank. In this case, an indicator in the digital subsystem may be set to indicate that the firmware is present in volatile memory.

Upon completion of development, the OTP memory of devices may then be programmed with a selected firmware image, e.g., via download to the volatile memory and then writing to the OTP memory. The indicator may then be set to indicate the presence of firmware in the OTP memory. Thus multiple semiconductor devices may be fabricated with a common mask set, and different groupings of the radio tuners may be programmed with different firmware versions to provide different functionality based on the firmware.

Applications for a semiconductor device including an OTP memory in accordance with an embodiment of the present invention are numerous. As one example, an integrated terrestrial audio broadcast receiver may implement the OTP memory. The receiver may include, in addition to the OTP memory and an integrated controller, a mixer to receive an incoming radio frequency (RF) signal and to provide an intermediate frequency (IF) signal, an analog-to-digital converter to convert the IF signal into a digital signal, and a digital signal processor to process the digital signal. The receiver may be used in a portable device having an integrated terrestrial audio broadcast receiver. The portable device, which may be a digital media player, such as an MP3 player, can include the ability to receive a wide variety of audio broadcasts, including AM spectrum and FM spectrum signals. In addition, the device may include additional memory such as a non-volatile memory for storage of digital music or other such files.

DETAILED DESCRIPTION

In various embodiments, a non-volatile memory such as a one-time programmable (OTP) memory may be used to store firmware for use with a semiconductor device. Such an OTP memory may allow rapid firmware updates to be implemented into production devices. Furthermore, embodiments may provide for volatile storage of firmware during a development cycle such that debugging can be performed efficiently. That is, different firmware versions may be directly downloaded to on-chip volatile memory, e.g., random access memory (RAM) and executed directly therefrom. In this way, rapid debugging and updating of firmware code can be realized without the expense associated with requiring new mask sets for a ROM in which firmware is typically stored.

Certain embodiments may be used in connection with a radio tuner. Accordingly, the firmware may include programs to enable radio operation such as demodulators, filters, radio data system (RDS), volume control, stereo blending and the like. In some implementations, a non-volatile memory may further store calibration data obtained during manufacturing testing of the chip. Accordingly, using actual operating parameters of a chip, each individual chip may be operated at its optimal settings (e.g., voltage, receiver sensitivity and the like). Additional information may be stored in the non-volatile memory including, for example, a unique identifier for the chip.

In various embodiments, the non-volatile memory may be written to during a programming mode (i.e., burning) during manufacture of the device. For example, the firmware may be burned via a serial pin of each die at a wafer level. The downloaded data may be sent to a memory controller on-chip, which then forwards the data to various volatile memories which then write the data to the non-volatile memory under control of the memory controller. To effect programming from the volatile memories to the non-volatile memory, a burn program may be executed on a microcontroller unit (MCU) of the chip.

Accordingly, using an OTP memory in accordance with an embodiment of the present invention, multiple differentiated products may be formed from devices on a single wafer. Thus there is no need to choose a selected set of features for firmware ahead of time. Instead, based on market demand, e.g., actual orders or the like, a selected firmware version may be written to a desired number of devices, while a different firmware version may be written to other devices, where all of the devices are of the same wafer or wafer lot, or multiple wafer lots built from a common mask set.

Figure 1:
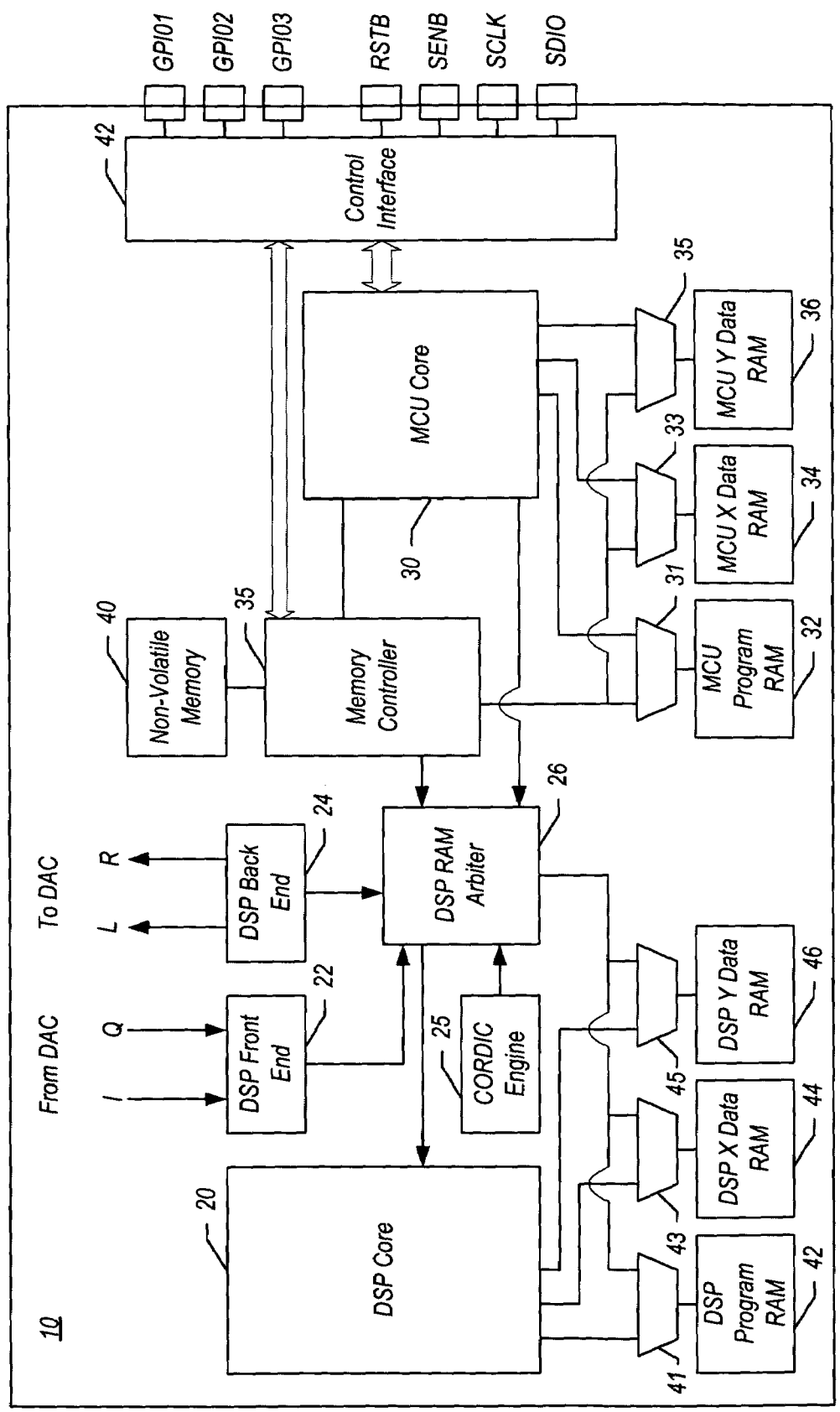
FIG. 1 is a block diagram of a digital subsystem in accordance with one embodiment of the present invention.

Referring now to FIG. 1, shown is a block diagram of a digital subsystem in accordance with one embodiment of the present invention. As shown in FIG. 1, digital subsystem 10 may include multiple cores for processing digital data in a radio tuner environment. These cores may include a digital signal processor (DSP) core 20 and a microcontroller unit (MCU) core 30. In various embodiments, MCU core 30 may be a controller for both digital subsystem 10 and an analog subsystem. DSP core 20 may be programmed to perform various algorithms for processing audio data, e.g., radio data.

Still referring to FIG. 1, DSP core 20 may be coupled to a DSP RAM arbiter 26 which arbitrates access to a plurality of volatile memories associated with DSP core 20. As shown in FIG. 1, multiple such volatile memories may be present, including a program RAM 42, and data RAMs 44 and 46. As shown in FIG. 1, multiplexers 41, 43 and 45 may be coupled between the RAMs, DSP core 20 and RAM arbiter 26 to selectively provide address and data information to and from the RAMs.

DSP core 20 is coupled via RAM arbiter 26 to a front end 22 which is coupled to receive incoming I and Q signals from an analog subsystem. Furthermore, a DSP back end 24 is coupled to provide outgoing digital signals to the analog subsystem. In one embodiment, DSP front end 22 may perform various functions including DDFS, CIC decimation, and comb filtering, while DSP back end 24 may perform CIC interpolation, along with delta-sigma DAC modulation. As further shown, a CORDIC engine 25 may be coupled to RAM arbiter 26. CORDIC engine 25 may be used to perform sine, cosine and tangent functions.

Still referring to FIG. 1, MCU core 30 may be coupled to a control interface 42 that in turn is coupled to transmit and receive data and control signals with another portion of a system. Furthermore, control interface 42 is directly coupled to a memory controller 35, which may control memory accesses to various memories of digital subsystem 10. These memories include a non-volatile memory (NVM) 40, which in various embodiments may be a one-time programmable (OTP) memory. Non-volatile memory 40 may be used to store program data for digital subsystem 10. That is, NVM 40 may store various programs that comprise firmware for both DSP core 20 and MCU core 30. Of course, NVM 40 may include other data and information, including boot software to enable booting of digital subsystem 10 on powering up of a system.

As further shown in FIG. 1, memory controller 35 and MCU core 30 are coupled to multiplexers 31, 33 and 35 that in turn are coupled to volatile memories associated with MCU core 30. Specifically, these memories include a program memory 32 and data memories 34 and 36. While shown with this particular implementation in the embodiment of FIG. 1, it is to be understood the scope of the present invention is not limited in this regard.

In certain implementations, control interface 42 may include a serial port that may be used to address a bank of registers that store incoming and outgoing information. Some of the register bits control digital and analog hardware, such as powering up on-chip voltage regulators and starting clocks. Other bits are used to communicate information between an external controller and firmware running on MCU core 30. This information may be used for configuration of the radio tuner (e.g., different operating modes, band size and spacing, RDS/RDBS decoding enable, etc.) and control of the radio tuner (tune or seek to a new station, change volume, stereo/mono select, etc.). Other bits are used to control three general purpose input/output (GPIO) pins, which can be controlled by MCU core 30.

In some embodiments, control interface 42 may include a register for storage of a control indicator, e.g. a bit that may be used to indicate whether boot up is to be performed using information in the various RAMs or NVM 40, depending on whether a firmware image has been burned into NVM 40.

Control interface 42 may be powered by a dedicated power pin, which allows the registers to retain state while the rest of a chip including digital subsystem 10 is powered down. In various embodiments, MCU core 30 may be a 8051-compatible microcontroller that executes code directly from program and data RAMs 32-36, and is used to initialize and calibrate all on-chip analog blocks including voltage regulators (LDOs), a voltage-controlled oscillator (VCO) and all components of an analog signal path for the receive chain (e.g., LNA, PGA, mixer, ADC and DAC). MCU core 30 may also execute a user's commands sent via control interface 42, to tune or seek to a new station, audio volume changes, and many other functions. When the chip boots, MCU core 30 uses memory controller 35 to copy code and data from NVM 40 to RAMs 32-36. During manufacturing test, MCU core 30 may be used to execute a temporary algorithm which is downloaded directly to volatile memory (e.g., RAM 32), which burns a firmware image into NVM 40.

In some implementations, DSP core 20 and its front and back ends 22 and 24, along with CORDIC engine 25 may be used to perform demodulation of digitized stereo FM signals, measure signal strength, and decode RDS/RDBS data from the signals. DSP core 20 may execute directly from program and data RAMs 42-46. The DSP firmware responds to commands from the MCU core 30 to enable/disable stereo, RDS/RDBS, volume changes, and so forth.

Memory controller 35 may be a general-purpose block that allows either control interface 42 or MCU core 30 to initiate block data transfers between any two memories, including NVM 40. It also performs automatic testing of RAMs (built-in self-test) during manufacturing test. During a normal chip bootstrap procedure, MCU core 30 issues commands to memory controller 35 to transfer firmware from NVM 40 to each on-chip RAM. The chip can be booted either by downloading firmware directly to the volatile memories via the serial port (which may allow efficient software development), or by automatically copying firmware from NVM 40 to the RAMs.

Figure 2:
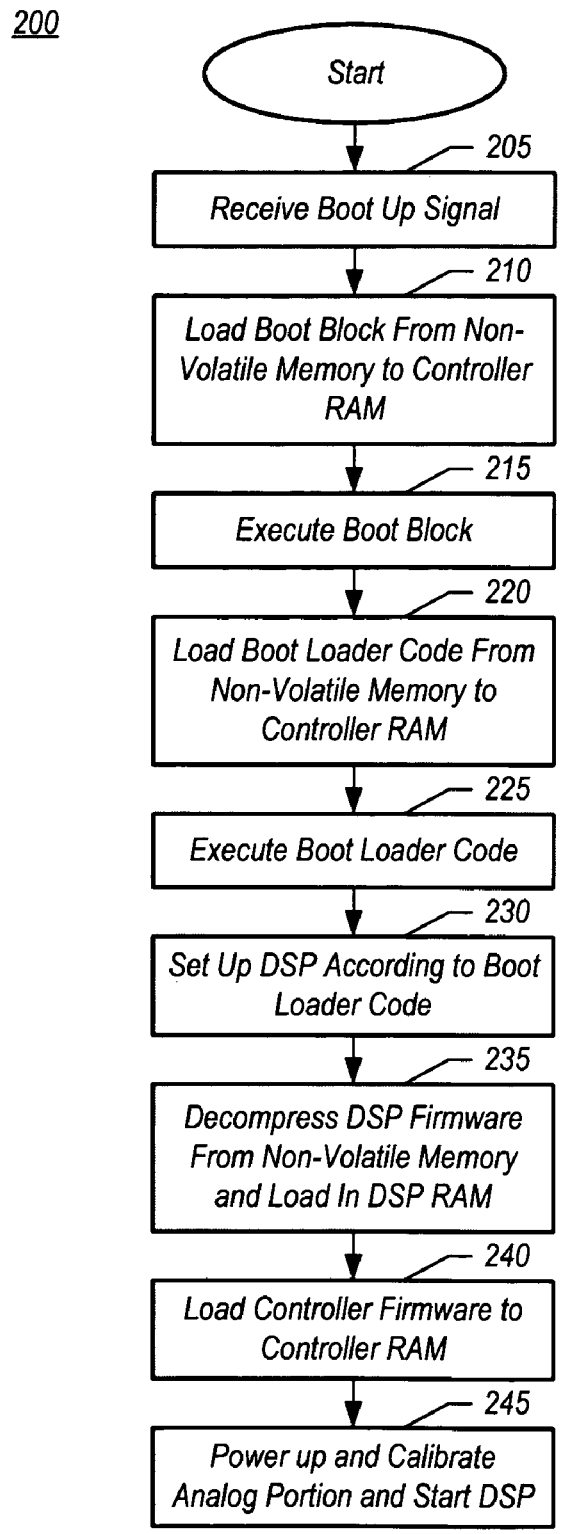
FIG. 2 is a flow diagram of a method of booting firmware in accordance with one embodiment of the present invention.

Referring now to FIG. 2, shown is a flow diagram of a method of booting firmware in accordance with one embodiment of the present invention. As shown in FIG. 2, method 200 may begin by receiving a boot up signal (block 205). For example, after power is applied to a chip, a user may write a register in control interface 42 via a serial port to provide an instruction to boot the firmware. Responsive to such a boot up signal, a boot block may be loaded from non-volatile memory to a controller RAM (block 210). For example, the boot block may correspond to a small segment of code in non-volatile memory 40 that is copied under control of memory controller 35, which may receive the boot up signal via a direct connection to control interface 42, to cause this boot block to be loaded from NVM 40 to program RAM 32.

Still referring to FIG. 2, next the boot block may be executed (block 215). Specifically, MCU core 30 may execute the boot block to issue commands to memory controller 35. These commands may include instructions to enable memory controller 35 to load boot loader code from the NVM to the controller RAM (block 220). In some embodiments MCU core 30 may put itself into a sleep mode to reduce power consumption while memory controller 35 loads the boot loader code. Upon completion of the loading, memory controller 35 may wake up MCU core 30, which may then execute the boot loader code (block 225). The boot loader code may be used to initialize various on-chip functionality. For example, DSP core 20 may be set up according to the boot loader code (block 230). For example, MCU core 30 may, under control of the boot loader code, issue commands to memory controller 35 to clear the DSP data memories and to copy small blocks of data from NVM 40 to DSP data memories 44 and 46. As one example, data RAMs 44 and 46 may store various program data such as digital coefficients for digital filtering performed by DSP core 20.

In some embodiments, the boot loader code may also include a small decompression algorithm which may be used to decompress DSP firmware obtained from non-volatile memory 40 and loaded into DSP RAM (block 235). This DSP firmware may correspond to the main DSP control program to enable the various operations performed by DSP core 20 during normal chip operation. Upon completion of loading the DSP code, which may be loaded into DSP program memory 42, controller firmware may be loaded into the controller RAM (block 240). For example, at its conclusion, the boot loader code may issue a command to memory controller 35 to copy firmware for MCU core 30 into program RAM 32. In some embodiments, MCU core 30 may be placed into a sleep state while memory controller 35 loads the firmware into program RAM 32. Upon completion, memory controller 30 may wake up MCU core 30.

Still referring to FIG. 2, finally MCU core 30 may be powered up and used to calibrate an analog portion coupled to the digital subsystem and start normal DSP operation (block 245). That is, MCU core 30 may begin executing its main program (i.e., firmware) from program RAM 32. This firmware may include code to perform power up and calibration of various analog components, e.g., the analog portion of a radio tuner. Furthermore, various activities, such as setting appropriate operating voltages and clock frequencies may be performed. Still further, MCU core 30 may initiate normal operation of DSP core 20. As such, the radio tuner may be ready for normal operation as DSP core 20 may tune to an initial radio station and wait for user commands. While described with this particular implementation in the embodiment of FIG. 2, it is to be understood the scope of the present invention is not limited in this regard. Note that in some embodiments, the non-volatile memory may be of a narrow width, e.g., 1 bit wide. Accordingly, the firmware stored in the non-volatile memory is loaded into volatile memories, e.g., program memories, for actual execution. However, in other embodiments code may be directly executed in place from the non-volatile memory.

As described above, using an OTP in accordance with an embodiment of the present invention, improved development and production cycles may be realized, as firmware versions can be flexibly modified and provided to a chip. Accordingly, a hardware design can be finalized and used to generate a mask set that is then used to fabricate wafers. While the fabrication process occurs, which may take a number of weeks, firmware can continue to be developed such that when manufacturing testing is ready to be performed on fabricated wafers, various firmware versions, which may correspond to development versions can be downloaded to the wafers. Based on such testing, rapid revisions to firmware may occur and may be rapidly provided to new wafers.

Figure 3:
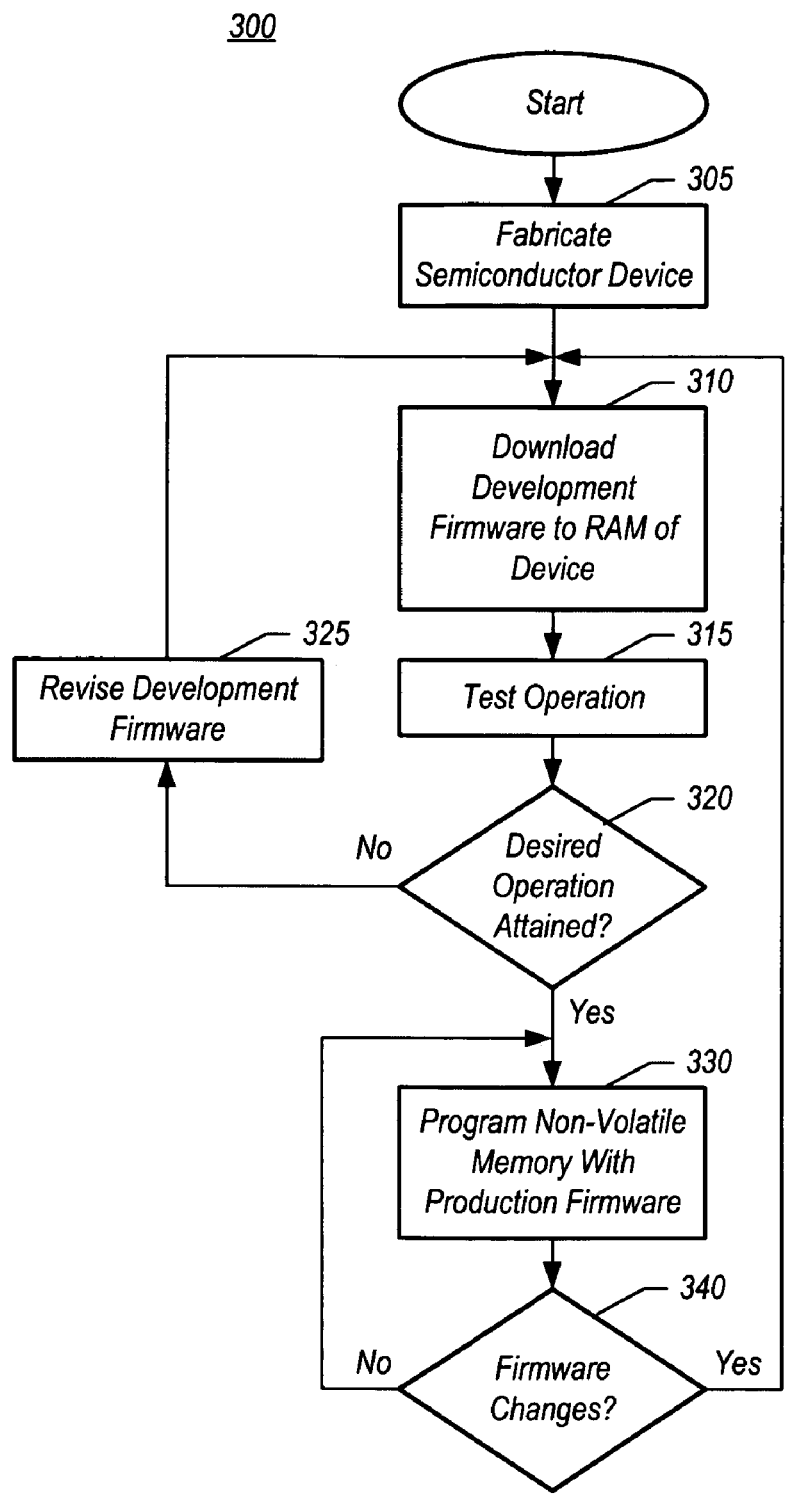
FIG. 3 is a flow diagram of a method of fabricating semiconductor devices in accordance with an embodiment of the present invention.

Referring now to FIG. 3, shown is a flow diagram of a method of fabricating semiconductor devices in accordance with an embodiment of the present invention. As shown in FIG. 3, method 300 may begin by fabricating the semiconductor device (block 305). That is, various standard semiconductor processing techniques may be used to fabricate semiconductor devices on a wafer. In one embodiment, these devices may correspond to a radio tuner, although the scope of the present invention is not limited in this regard. The radio tuner may be a single chip device including both analog and digital portions. A digital portion may include a non-volatile memory, e.g., an OTP memory as described herein.

Still referring to FIG. 3, next a development firmware version may be downloaded to a RAM of the device (block 310). For example, while at the wafer level, a development version of firmware may be downloaded, e.g., via a serial pin of the device. Furthermore, this firmware may be directly written to on-chip RAMs, e.g., multiple RAMs including program and data RAMs used for both DSP and MCU cores. As an example, a tester to which a wafer is coupled may send an entire firmware image that is then provided through a serial port, e.g., control interface 42 through memory controller 35, which then stores it in the various RAMs. Accordingly, the on-chip RAMs may be sized such that an entire firmware image for the chip can be downloaded into the various RAMs, e.g., under control of the memory controller. That is, in various embodiments the memory controller may create a memory space amongst the various RAMs of the device to store an incoming firmware image, either for direct execution therefrom, or for subsequent programming of the NVM.

Next, operation of the device may be tested (block 315). For example, various functional and operational parameter tests may be performed to determine whether the device with the firmware operates as desired. Accordingly, it may be determined whether the desired operation has been attained (diamond 320). If not, the development firmware may be revised (block 325), and control may return to block 310 where the revised firmware may be downloaded.

Still referring to FIG. 3, if at diamond 320 it is determined that desired operation has been attained, control passes to block 330, where the non-volatile memory may be programmed with production firmware. For example, firmware burning may occur by downloading the firmware, e.g., to the RAMs of the chip. Then under memory controller control, the firmware may be burned into the OTP memory. Accordingly, production devices may be realized with a given firmware image. Note that in various implementations, multiple firmware versions may be generated such that different devices formed of a single wafer or within one or more wafer lots can each be programmed with different firmware versions. These firmware versions may thus provide different functionality, allowing a single mask set to be used to produce devices having different functionalities, which may provide for sales at different price points.

Still referring to FIG. 3, during marketing of a chip, which may occur over a number of months or years, it may be determined that firmware changes should take place (diamond 340). Such firmware changes may correspond to debugging or improving of various features or including additional features and the like. If such a determination is made, control may pass back to block 310, where a revised firmware version may be provided to devices to verify and then generate production devices with such updated firmware. Although described with this implementation in the embodiment of FIG. 3, it is to be understood that other manners of programming an OTP memory with firmware may be realized.

Figure 4:
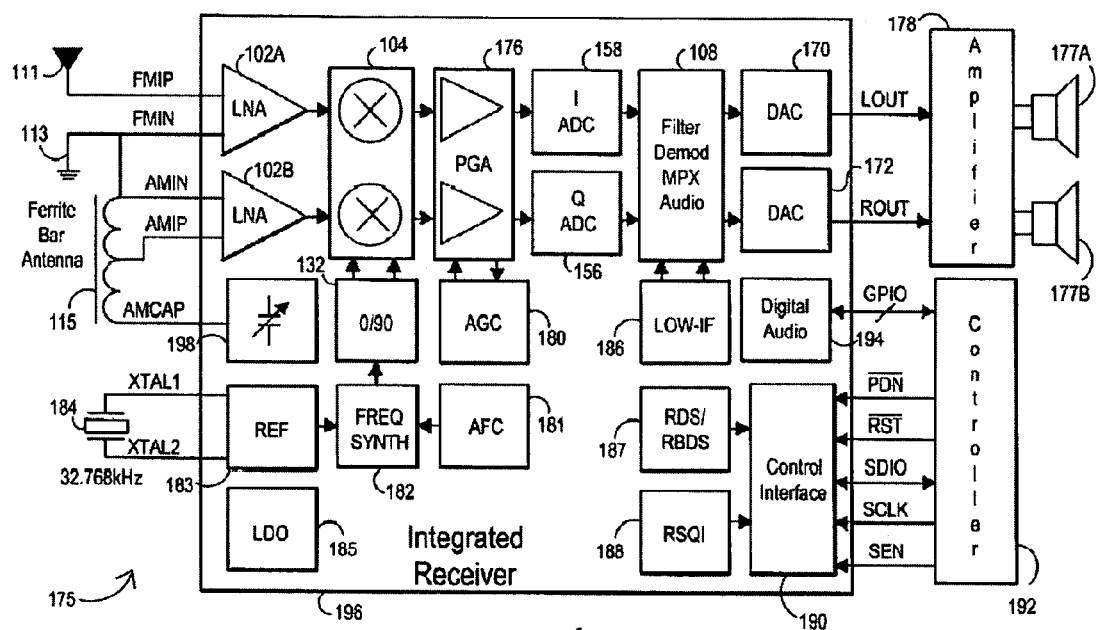
FIG. 4 is a block diagram of one example embodiment for an integrated terrestrial broadcast receiver.

FIG. 4 is a block diagram of one example embodiment 175 for an integrated terrestrial broadcast receiver 196. In the embodiment depicted, the integrated receiver 196 includes an AM antenna and an FM antenna. The FM antenna 111 provides a differential FM input signal, which is represented by signals FMIP (FM input positive) and FMIN (FM input negative), to a first low noise amplifier (LNA) 102A. The FMIN node is coupled to ground 113. The AM antenna 115 provides a differential AM input signal, which is represented by signals AMIP (AM input positive) and AMIN (AM input. negative), to a second low noise amplifier (LNA) 102B. LNA's 102A and 102B may be digitally controlled. The AMIN node is coupled to ground 113. The AM antenna 115, as depicted, is a ferrite bar antenna, and the AM reception can be tuned using an on-chip variable capacitor circuit 198. The connection between the on-chip variable capacitor circuit 198 and the AM antenna 115 is represented by the AMCAP signal. It is also noted that the FM antenna reception can also be tuned with an on-chip variable capacitor circuit, if desired. With respect to the power supply for the integrated receiver 196, an integrated supply regulator (LDO) block 185 can be provided to help regulate the on-chip power.

The outputs of the LNAs 102A and 102B are processed by mixer 104 to generate real (I) and imaginary (Q) signals. These signals are the processed by a programmable gain amplifier (PGA) 176, which is controlled by the automatic gain control (AGC) block 180. The output signals from the PGA 176 are then converted to digital I and Q values with I-path ADC 158 and Q-path ADC 156. In some embodiments, digital subsystem 10 of FIG. 1 may generally correspond to all circuitry in integrated receiver 196 to the right of ADCs 158 and 156. Of course, at least portions of ADCs 156 and 158 may further be included in digital subsystem 10. DSP circuitry 108 then processes the digital I and Q values to produce left (L) and right (R) digital audio output signals that can be provided to digital-to-analog conversion (DAC) circuits 170 and 172, to produce left (LOUT) and right (ROUT) analog output signals. These analog output signals can then be output to listening devices, such as headphones. Amplifier 178 and speaker outputs 177A and 177B, for example, can represent headphones for listening to the analog audio output signals. The DSP circuitry 108 can provide a variety of processing features, including digital filtering, FM and AM demodulation (DEMOD) and stereo/audio decoding, such as MPX decoding. Low-IF block 186 includes additional circuitry utilized to control the operation of the DSP circuitry 108 in processing the digital I/Q signals.

A digital control interface 190 can also be provided within integrated receiver 196 to communicate with external devices, such as controller 192. As depicted, the digital communication interface includes a power-down (PDN_) input signal, reset (RST_) input signal, a bi-directional serial data input/output (SDIO) signal, a serial clock input (SCLK) signal, and a serial interface enable (SEN) input signal. As part of the digital interface, digital audio block 194 which may be present in some embodiments can also output digital audio signals to external devices, such as controller 192. As depicted, this communication is provided through one or more GPIO signals. The GPIO signals represent pins on the integrated receiver 196 that can be user programmed to perform a variety of functions, as desired, depending upon the functionality desired by the user. In addition, a wide variety of control and/or data information can be provided through the interface 190 to and from external devices, such as controller 192. For example, a RDS/RBDS block 187 can report relevant RDS/RBDS data through the control interface 190. And a receive strength quality indicator block (RSQI) 188 can analyze the receive signal and report data concerning the strength of that signal through the control interface 190. It is noted that other communication interfaces could be used, if desired, including serial or parallel interfaces that use synchronous or asynchronous communication protocols.

Looking back to the mixer 104 of FIG. 4, LO mixing signals are received by mixer 104 from a phase shift block (0/90) 132 that produces two mixing signals that are 90 degrees out of phase with each other. The phase shift block 132 receives an oscillation signal from frequency synthesizer (FREQ SYNTH) 182. Frequency synthesizer 182 receives a reference frequency from reference frequency (REF) block 183 and a control signal from automatic frequency control (AFC) block 181. An external crystal oscillator 184, operating, for example, at 32.768 kHz, provides a fixed reference clock signal to the reference frequency (REF) block 183 through connections XTAL1 and XTAL2. The AFC block 181 can receive a tuning error signal from the receive path circuitry within the integrated receiver 196 and provide a correction control signal to the frequency synthesizer 182. While shown with this particular implementation in the embodiment of FIG. 4, it is to be understood that this embodiment is shown for illustrative purposes only and a digital subsystem in accordance with an embodiment of the present invention including an OTP memory and be placed into various systems other than the integrated receiver shown in FIG. 4.

In various implementations, instructions in the form of an article of manufacture such as a tangible memory or a signal-bearing medium may be used to store or transmit instructions to enable programming and control of an OTP memory in accordance with an embodiment of the present invention.

Figure 5:
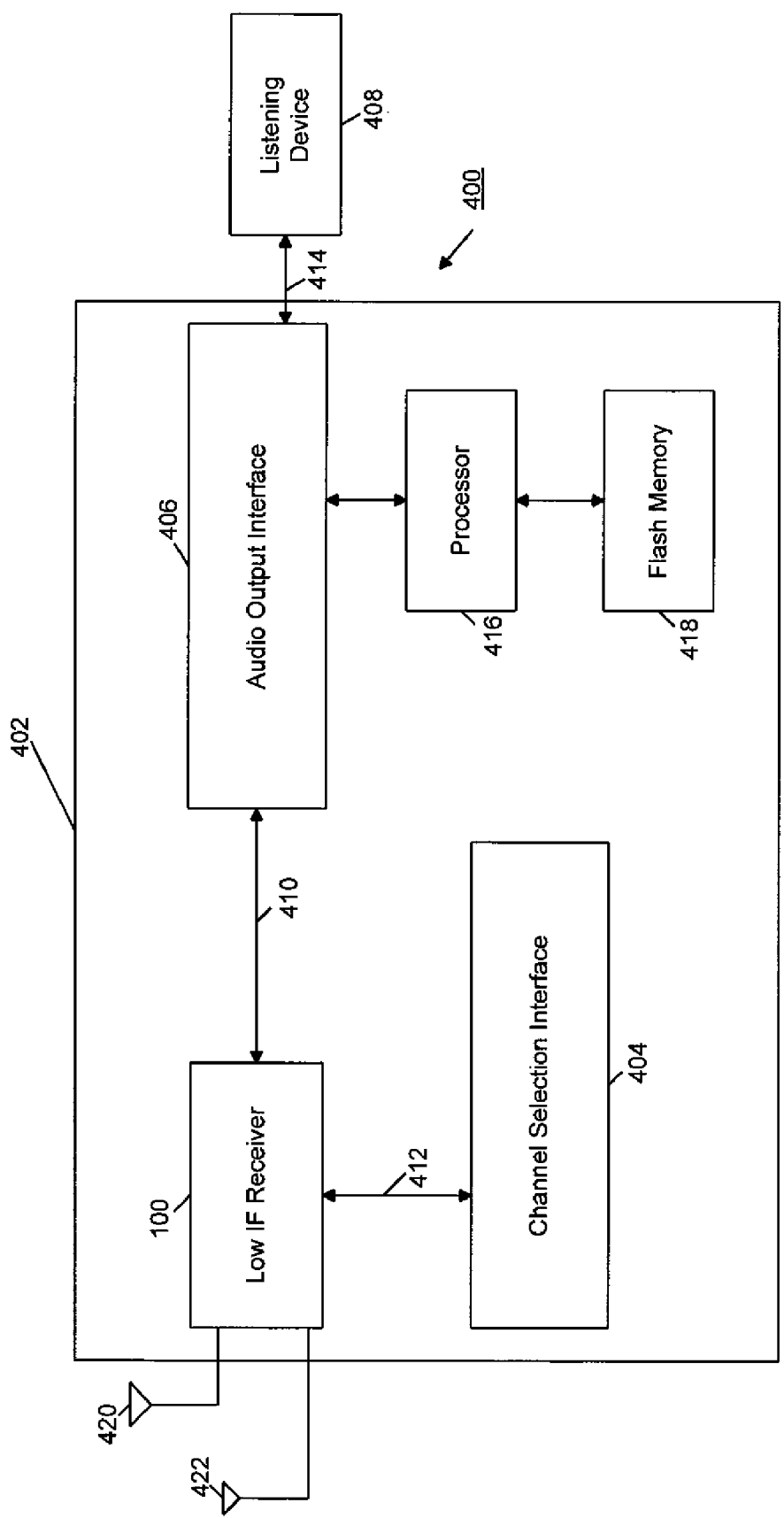
FIG. 5 is a block diagram of an embodiment for a portable device according to the present invention.

FIG. 5 is a block diagram of an embodiment 400 for a portable device 402 that utilizes a low-IF integrated terrestrial broadcast receiver 100 according to the present invention. As depicted, the portable device includes a low-IF receiver integrated circuit 100 coupled to a channel selection interface circuitry 404 through connections 412 and to an audio output interface circuitry 406 through connections 410. The audio output interface circuitry 406 is in turn coupled to listening device 408 through connections 414. In such a portable environment, the listening device 408 is often headphones that can be easily plugged into the portable device 402. The embodiment 400 can also include one or more antennas, such as an FM broadcast antenna 420 and an AM broadcast antenna 422. It is noted that a portable device as contemplated in this embodiment is preferably a small portable device. For example, portable device 402 could be a cellular phone, a portable media player, a PC card for a portable computer, a USB connected device or any other small portable device having an integrated receiver. Thus as shown in FIG. 5, a separate processor 416 and a flash memory 418, e.g., for storage of digital audio/video files may be present. It is also noted that the audio output interface 406 can provide digital audio output signals, analog audio output signals, or both.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
a digital signal processor (DSP);
a controller coupled to the DSP to provide control signals to the DSP;
a one-time programmable (OTP) memory coupled to the DSP and the controller, the OTP memory including a first code block to control the DSP and a second code block to control the controller; and
a memory controller coupled to the OTP memory and a plurality of volatile memories including a first program volatile memory and a first data volatile memory associated with the DSP and a second program volatile memory and a second data volatile memory associated with the controller, wherein the memory controller is to download firmware to the plurality of volatile memories, wherein the OTP memory is blank and the memory controller is to thereafter burn the firmware to the OTP memory, wherein the memory controller is to load boot loader code to the second program volatile memory while the controller is in a sleep mode and to thereafter wake up the controller to execute the boot loader code.

2. The apparatus of claim 1, wherein the apparatus comprises a radio tuner, the radio tuner including a single substrate having the DSP, the controller, the OTP memory, and an analog radio portion.

3. The apparatus of claim 2, wherein the first code block and the second code block comprise firmware, and wherein the firmware is to perform radio control functions and analog calibration of the analog radio portion.

4. The apparatus of claim 1, wherein the first program volatile memory is to receive and store the first code block during operation.

5. The apparatus of claim 4, wherein the second volatile memory is to receive and store the second code block during operation.

6. The apparatus of claim 1, wherein at least the first code block is stored in a compressed format in the OTP memory.

7. The apparatus of claim 1, wherein the OTP memory further includes:
a third code block, the third code block comprising a boot block to be accessed by the controller on power up of the apparatus; and
a fourth code block, the fourth code block comprising a boot loader to be executed by the controller, the boot loader including a decompression algorithm to decompress the first code block when it is provided to the first program volatile memory.

8. The apparatus of claim 7, further comprising a register to store an indicator to indicate whether the firmware is stored in the plurality of volatile memories or the OTP memory.

9. A system comprising:
a processor to perform instructions;
a radio tuner coupled to the processor, the radio tuner including a digital signal processor (DSP), a controller coupled to the DSP, a one-time programmable (OTP) memory coupled to the DSP and the controller, the OTP memory including a first code block to control the DSP and a second code block to control the controller, and a memory controller coupled to the OTP memory and a plurality of volatile memories including a first program volatile memory and a first data volatile memory associated with the DSP and a second program volatile memory and a second data volatile memory associated with the controller, wherein the memory controller is to load the first and second code blocks to the first and second program volatile memories for execution by the DSP and the controller therefrom and the OTP memory is to store a boot code portion to be accessed under control of the memory controller, the boot code portion to be executed by the controller, the OTP memory further storing a loader code portion to be loaded into the second program volatile memory while the controller is in a sleep state, wherein the loader code portion includes a decompression algorithm to decompress the first code block before it is stored in the first program volatile memory; and
a non-volatile storage device to store information including digital audio files.

10. The system of claim 9, wherein the system comprises a portable media player.

11. The apparatus of claim 1, wherein the controller is to execute a boot block to enable the memory controller to load the boot loader code, and to thereafter enter the sleep mode.

12. A system comprising:
a processor to perform instructions;
a radio tuner coupled to the processor to receive and process an incoming radio frequency (RF) signal, the radio tuner including an analog portion having a mixer to receive the RF signal and to provide an intermediate frequency (IF) signal, a converter to convert the IF signal to a digital signal, a digital signal processor (DSP) to process the digital signal, a controller coupled to the DSP, a one-time programmable (OTP) memory coupled to the DSP and the controller, the OTP memory including a first code block to control the DSP and a second code block to control the controller, a memory controller coupled to the OTP memory and at least one volatile memory, and to cause a loader code portion stored in OTP memory and to be executed by the controller to be loaded into the at least one volatile memory while the controller is in a sleep state; and
a non-volatile storage device to store information including digital audio files.

13. The system of claim 12, wherein the at least one volatile memory includes a first program volatile memory and a first data volatile memory associated with the DSP and a second program volatile memory and a second data volatile memory associated with the controller.

14. The system of claim 13, wherein the memory controller is to load the first and second code blocks to the first and second program volatile memories for execution by the DSP and the controller therefrom.

15. The system of claim 12, wherein the loader code portion includes a decompression algorithm to decompress the first code block before it is stored in the first program volatile memory.

* * * * *